United States Patent
Sugumar et al.

(10) Patent No.: US 7,124,284 B2
(45) Date of Patent: Oct. 17, 2006

(54) METHOD AND APPARATUS FOR PROCESSING A COMPLEX INSTRUCTION FOR EXECUTION AND RETIREMENT

(75) Inventors: Rabin A. Sugumar, Sunnyvale, CA (US); Sorin Iacobovici, San Jose, CA (US); Chandra M. R. Thimmannagari, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 538 days.

(21) Appl. No.: 10/337,056

(22) Filed: Jan. 6, 2003

(65) Prior Publication Data

US 2004/0133432 A1 Jul. 8, 2004

(51) Int. Cl.
 G06F 9/30 (2006.01)
 G06F 9/40 (2006.01)
 G06F 15/00 (2006.01)
(52) U.S. Cl. .................................... 712/218
(58) Field of Classification Search ............... 712/218
 See application file for complete search history.

(56) References Cited

U.S. PATENT DOCUMENTS

| 5,357,617 | A | * | 10/1994 | Davis et al. ............... 712/245 |
| 5,745,721 | A | * | 4/1998 | Beard et al. ............... 712/208 |
| 6,282,708 | B1 | * | 8/2001 | Augusteijn et al. ......... 717/156 |
| 2003/0061258 | A1 | * | 3/2003 | Rodgers et al. ............ 709/102 |

OTHER PUBLICATIONS

A Tour of the P6 Microarchitecture.*
Computer Organization & Design by Daved Patterson and John Hennessy.*

* cited by examiner

*Primary Examiner*—Eddie Chan
*Assistant Examiner*—Brian Johnson
(74) *Attorney, Agent, or Firm*—Osha Liang LLP

(57) ABSTRACT

A method and apparatus to determine readiness of a complex instruction for retirement includes decoding a complex instruction into a plurality of helper instructions; executing the plurality of helper instructions using an execution unit; indicating the plurality of helper instructions that are alive using a live instruction register; and maintaining a complex instruction identification for the complex instruction using a complex instruction identification register.

19 Claims, 3 Drawing Sheets

METHOD AND APPARATUS FOR PROCESSING A COMPLEX INSTRUCTION FOR EXECUTION AND RETIREMENT

BACKGROUND OF THE INVENTION

As shown in FIG. 1, a computer (24) includes a processor (26), memory (28), a storage device (30), and numerous other elements and functionalities found in computers. The computer (24) may also include input means, such as a keyboard (32) and a mouse (34), and output means, such as a monitor (36). Those skilled in the art will appreciate that these input and output means may take other forms.

The processor (26) may be required to process complex instructions. A complex instruction may require a large amount of hardware and system complexity to support the processing of the complex instruction. An alternative is to support the complex instruction with a software trap.

A software trap may map a complex instruction into a plurality of instructions readily supported by the processor (26). A reduced amount of hardware may be needed to support the plurality of instructions; however, mapping a complex instruction into a plurality of instructions may take time.

SUMMARY OF INVENTION

According to one aspect of the present invention, an instruction retirement apparatus comprising an instruction decode unit arranged to decode a complex instruction into a plurality of helper instructions; an execution unit arranged to execute the plurality of helper instructions; a live instruction register arranged to indicate which of the plurality of helper instructions are alive; and a complex instruction identification register arranged to maintain a complex instruction identification for the complex instruction.

According to one aspect of the present invention, a method for determining instruction retirement readiness comprising decoding a complex instruction into a plurality of helper instructions; executing the plurality of helper instructions; indicating which of the plurality of helper instructions are alive using a live instruction register; and maintaining a complex instruction identification for the complex instruction using a complex instruction identification register.

According to one aspect of the present invention, an apparatus to determine instruction retirement readiness comprising means for decoding a complex instruction into a plurality of helper instructions; means for executing the plurality of helper instructions; means for indicating which of the plurality of helper instructions are alive; and means for maintaining a complex instruction identification for the complex instruction.

Other aspects and advantages of the invention will be apparent from the following description and the appended claims.

DETAILED DESCRIPTION

Embodiments of the present invention relate to an apparatus and method for determining readiness of a complex instruction for retirement. A complex instruction may be decoded into a plurality of helper instructions in hardware. The plurality of helper instructions are operatively forwarded to an execution unit for execution. The complex instruction is decoded into a plurality of helper instructions because processing helper instructions may reduce an amount of hardware and system complexity needed to support the complex instruction. The number of helper instructions associated with a complex instruction may depend on a complexity of the complex instruction. In one embodiment, a complex instruction may be decoded into three, six, or nine helper instructions.

The complex instruction can not be retired until all helper instructions associated with the complex instruction are known to have executed without generating an exception. If an exception occurs, a software trap may be required to resolve the exception. The complex instruction and/or one or more helper instructions may need to be executed again as a result of a software trap.

Figure 1:
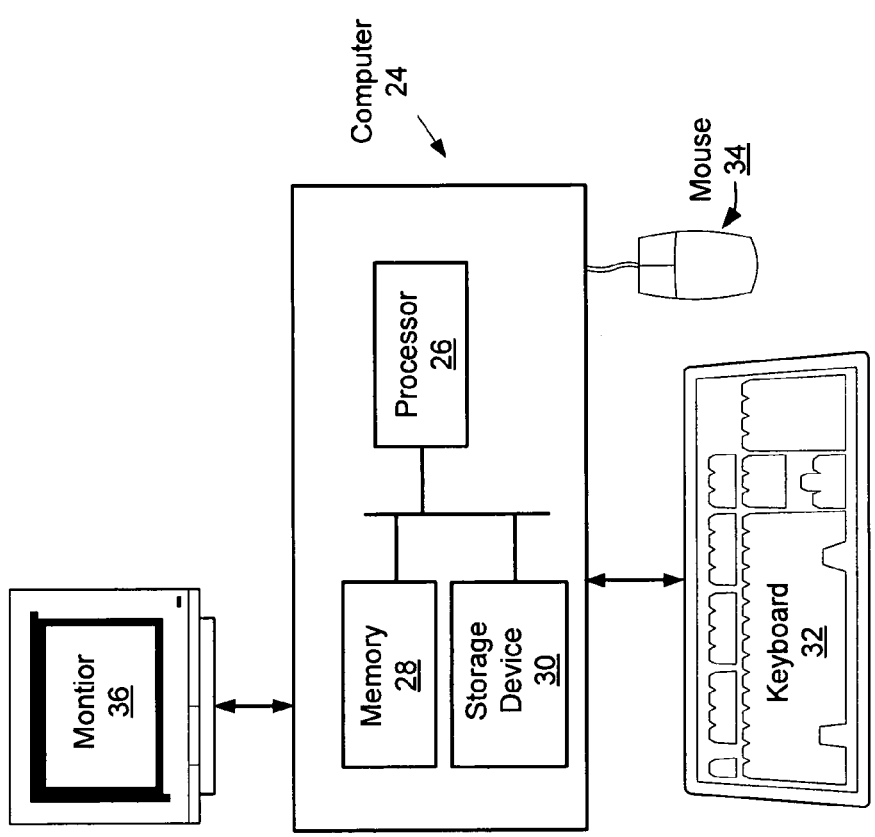
FIG. 1 shows a block diagram of a prior art computer system.
Figure 2:
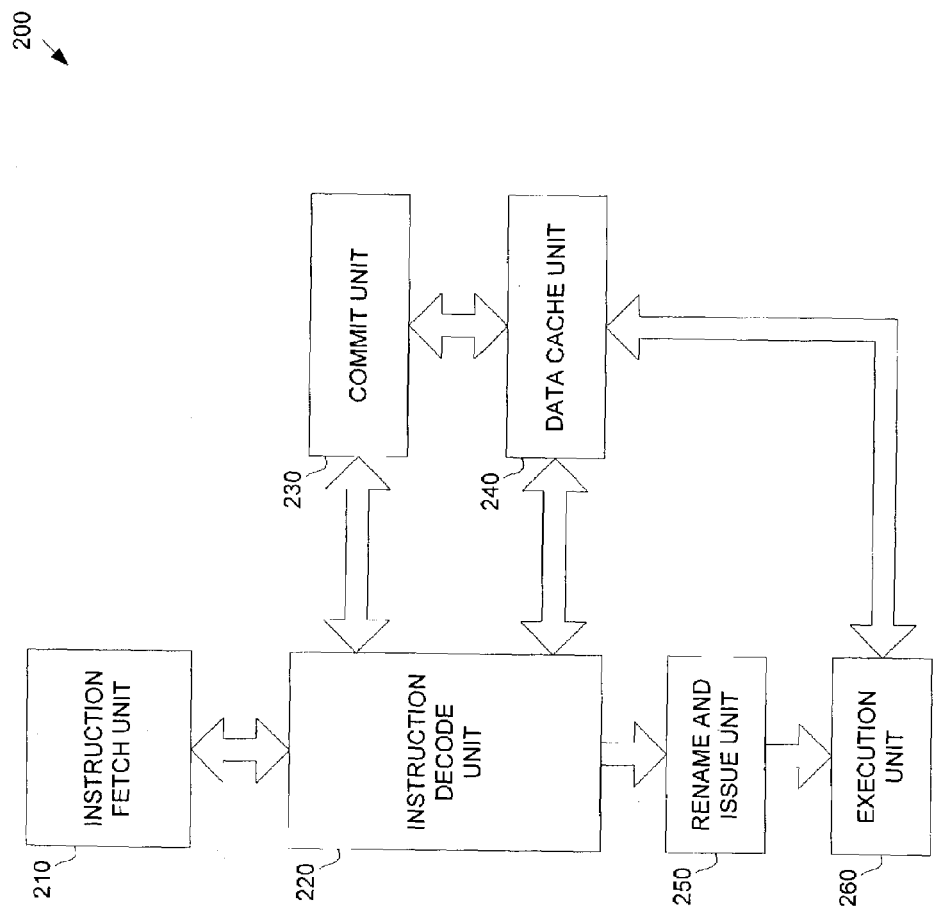
FIG. 2 shows a block diagram of a computer system pipeline in accordance with an embodiment of the present invention.

In one embodiment, a processor may maintain information about which instructions are helper instructions, which helper instructions are associated with a particular complex instruction, which, if any, of the helper instructions have generated an exception, and when all the helper instructions have been executed such that the complex instruction may be retired. Furthermore, FIG. 2 shows a block diagram of an exemplary computer system pipeline (200) in accordance with an embodiment of the present invention. The computer system pipeline (200) includes an instruction fetch group (210), an instruction decode unit (220), a commit unit (230), a data cache unit (240), a rename and issue unit (250), and an execution unit (260). Those skilled in the art will note that not all functional units are shown in the computer system pipeline (200), e.g., a memory management unit. One of ordinary skill in the art will also understand that any of the units (210, 220, 230, 240, 250, 260) may be pipelined or include more than one stage. Accordingly, any of the units (210, 220, 230, 240, 250, 260) may take longer than one cycle to complete a process.

The instruction fetch unit (210) is responsible for fetching instructions from memory. Accordingly, instructions may not be readily available, i.e., a miss occurs. The instruction fetch unit (210) performs actions to fetch the proper instructions.

In one embodiment of the present invention, the instruction fetch unit (210) allows two instruction strands to be running in the instruction fetch unit (210) at any time. Accordingly, at least two buffers are maintained to support the two strands. Furthermore, the instruction fetch unit (210) fetches bundles of instructions. For example, in one or more embodiments, up to three instructions may be included in each bundle.

In an embodiment of the present invention, the instruction decode unit (220) is responsible for recognizing a complex instruction and breaking the complex instruction into helper instructions before forwarding the helper instructions to the next stage in the computer system pipeline (200), e.g., the rename and issue unit (250). The instruction decode unit (220) may also flatten register fields, manage resources, kill delay slots, determine strand switching, and determine the existence of a front end stall. Flattening a register field maps a smaller number of register bits to a larger number of register bits that maintain the identity of the smaller number of register bits and additional information such as a particular architectural register file. A front end stall may occur if an instruction is complex, requires serialization, is a window management instruction, results in a hardware spill/fill, has an evil twin condition, or a control transfer instruction, i.e., has a branch in a delay slot of another branch.

A complex instruction is an instruction not directly supported by hardware and may require the complex instruction to be broken into a plurality of instructions supported by hardware. An evil twin condition may occur when executing a fetch group that contains both single and double precision floating point instructions. A register may function as both a source register of the single precision floating point instruction and as a destination register of a double precision floating point instruction, or vice versa. The dual use of the register may result in an improper execution of a subsequent floating point instruction if a preceding floating point instruction has not fully executed, i.e., committed the results of the computation to an architectural register file.

The commit unit (230) is responsible for maintaining an architectural state of the computer system pipeline (200) and initiating traps as needed. The commit unit (230) keeps track of which strand is "alive." A strand is alive if a computer system pipeline has instructions for the strand, and the strand is not in a parked or wait state. A parked state or a wait state is a temporary stall of a strand. A parked state is initiated by an operating system, whereas a wait state is initiated by program code. Furthermore, the commit unit (230) is responsible for retiring instructions once the commit unit (230) determines that an instruction has executed without generating and exception.

The data cache unit (240) is responsible for providing memory access to load and store instructions. Accordingly, the data cache unit (240) includes a data cache, and surrounding arrays, queues, and pipes needed to provide memory access.

The rename and issue unit (250) is responsible for renaming, picking, and issuing instructions. Renaming takes flattened instruction source registers provided by the instruction decode unit (220) and renames the flattened instruction source registers to working registers. Renaming may start in the instruction decode unit (220). Also, the renaming determines whether the flattened instruction source registers should be read from an architectural or working register file.

Picking monitors an operand ready status of an instruction in an issue queue, performs arbitration among instructions that are ready, and selects which instructions are issued to execution units. The rename and issue unit (250) may issue one or more instructions dependent on a number of execution units and an availability of an execution unit. The computer system pipeline (200) may be arranged to simultaneously process multiple instructions.

Issuing instructions steers instructions selected by the picking to an appropriate execution unit.

The execution unit (260) is responsible for executing instructions. In an embodiment of the present invention, the execution unit (260) may execute up to three instructions simultaneously.

In FIG. 2, each of the units (210, 220, 230, 240, 250, 260) provides processes to load, break down, and execute instructions. Resources are required to perform the processes. In an embodiment of the present invention, resources are any queue that may be required to process an instruction. For example, the queues include a live instruction table, issue queue, integer working register file, floating point working register file, condition code working register file, load queue, store queue, and branch queue. As some resources may not be available at all times, some instructions may be stalled. Furthermore, because some instructions may take more cycles to complete than other instructions, or resources may not currently be available to process one or more of the instructions, other instructions may be stalled. A lack of resources may cause a resource stall. Instruction dependency may also cause some stalls. Accordingly, switching strands may allow some instructions to be processed by the units (210, 220, 230, 240, 250, 260) that may not otherwise have been processed at that time.

Figure 3:
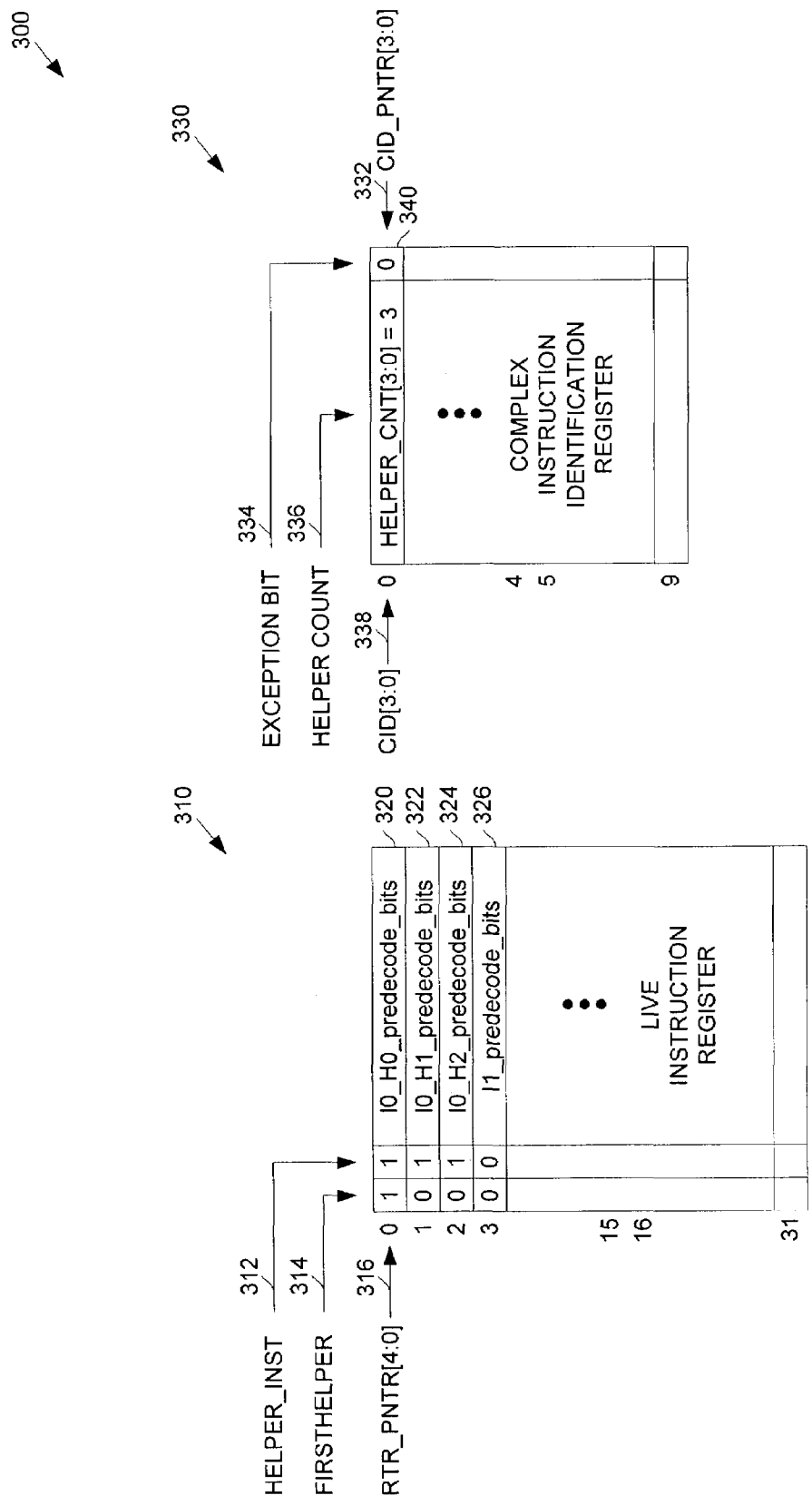
FIG. 3 shows a block diagram of a portion of a commit unit in accordance with an embodiment of the present invention.

FIG. 3 shows a block diagram of a portion of an exemplary commit unit (300) in accordance with an embodiment of the present invention. The portion of the commit unit (300) includes a live instruction register (310) and a complex instruction identification register (330). The live instruction register (310) has 32 entries, and the complex instruction identification register (330) has 10 entries. In one embodiment of the invention, the live instruction register includes one or more helper instruction registers for storing helper instructions, a retirement pointer register that stores pointers to helper instructions that need to be processed, and an instruction predecode register for storing complex instructions that have not been decoded into helper instructions. All entries in the live instruction register (310) and the complex instruction identification register (330) are available in single strand mode. The number of entries is halved in the live instruction register (310) and the complex instruction identification register (330) if the commit unit (300) is in dual strand mode. Accordingly, the live instruction register (310) has 16 entries for each strand, and the complex instruction identification register (330) has 5 entries for each strand.

In FIG. 3, according to one or more embodiments of the present invention, whenever the instruction decode unit (220 shown in FIG. 2) forwards helper instructions for a complex instruction, the instruction decode unit (220 shown in FIG. 2) also forwards the following attributes along with every helper instruction to the commit unit (230 shown in FIG. 2) and other units in the computer system pipeline (200 shown in FIG. 2): FIRSTHELPER (314), HELPER_INST (312), CID[3:0] (338), HELPERCOUNT (336), and STRAND_ID (not shown). STRAND_ID equals zero if an instruction is from strand zero, and equals one if an instruction is from strand one.

The FIRSTHELPER (314) bit indicates that a helper instruction is a first helper of a plurality of helper instructions decoded from a complex instruction. The HELPER_INST (312) indicates that an instruction is a helper instruction. The CID[3:0] (338) is a complex instruction identification assigned by the instruction decode unit (220 shown in FIG. 2) to a complex instruction. In an embodiment of the present invention, the commit unit (230 shown in FIG. 2) supports a 32-entry live instruction register (310) in a single strand mode.

In an embodiment of the present invention, a maximum of 10 live complex instructions in the computer system pipeline (200 shown in FIG. 2) may exist at any given time because the live instruction register (310) supports 32 entries and a complex instruction may be decoded into a minimum of three helper instructions.

Accordingly, the instruction decode unit (220 shown in FIG. 2) provides a 4 bit field for the CID[3:0] (338). When an assignment counter that generates the CID[3:0] (338) in the instruction decode unit (220 shown in FIG. 2) increments from 9 (in single strand mode), the assignment counter resets the CID[3:0] (338) to zero. Accordingly, the assignment counter starts incrementing the CID[3:0] (338) from zero again. The assignment counter in the instruction decode unit (220 shown in FIG. 2) will also initialize the CID[3:0] (338) to zero when the instruction decode unit (220 shown in FIG. 2) receives a pipe_clear signal generated by the commit unit (230 shown in FIG. 2) as a result of an instruction refetch.

Helper instructions corresponding to a complex instruction get assigned the same CID[3:0] (338) value. For example, helper instructions corresponding to a first complex instruction in the instruction decode unit (220 shown in FIG. 2) gets assigned CID[3:0] (338)=0. Helper instructions corresponding to a second complex instruction in the instruction decode unit (220) gets assigned CID[3:0] (338)=1.

The HELPER_CNT (336) bits in the complex instruction identification register (330) indicate the number of helper instructions corresponding to a complex instruction. For example, a HELPER_CNT[3:0] (340)=3 indicates that three helper instructions are associated with a complex instruction decoded in the instruction decode unit (220 shown in FIG. 2). Accordingly, three helper instructions are listed in the live instruction register (310). A first helper instruction, e.g., helper instruction (320), listed in the live instruction register (310) will have the FIRSTHELPER (314) bit set. Subsequent helper instructions, e.g., helper instructions (322, 324), do not have the FIRSTHELPER (314) bit set. All three helper instructions, e.g., helper instructions (320, 322, 324), have the HELPER_INST (312) bit set. Non-helper instructions, e.g., instruction (326), does not have the FIRSTHELPER (314) bit or the HELPER_INST (312) bit set.

The complex instruction identification register (330) maintains a 10-entry register that is indexed by the CID_PNTR[3:0] (332) of the active strand. The complex instruction identification register (330) maintains a 4-bit CID_PNTR[3:0] (332) pointer that points to one of the 10 entries in the complex instruction identification register (330) in single strand mode. The CID_PNTR[3:0] (332) is incremented whenever a complex instruction is retired. The CID_PNTR[3:0] (332) is reset to zero as a result of an instruction refetch or when the CID_PNTR[3:0] (332) equals 9 while a complex instruction is retired in single strand mode. The complex instruction identification register (330) is arranged such that the CID_PNTR[3:0] (332) value corresponds to a register location; therefore, no additional bits are needed to identify the CID[3:0] (338). For example, a CID_PNTR[3:0] (332) value of four indexes the register location equal to the CID[3:0] (338) value of four.

In a dual strand mode, the live instruction register (310) has 16 entries for each strand, and the complex instruction identification register (330) has 5 entries for each strand. Accordingly, two CID[3:0] counters, one for each strand, are maintained in an instruction decode unit, for example, the instruction decode unit (210) shown in FIG. 2. Only one CID[3:0] (338), however, is forwarded to the commit unit (300) from the instruction decode unit. In the dual strand mode, the commit unit (300) ignores a most significant bit of a received CID[3:0] (338) and uses the forwarded STRAND_ID to determine which strand the CID[3:0] (338) corresponds to. Two CID_PNTR[3:0] exist in the commit unit (300) to support the dual strand mode. One CID_PNTR[3:0] accesses register locations 0 to 4 in the complex instruction identification register (330) to support strand 0, and the other CID_PNTR[3:0] accesses register locations 5 to 9 in the complex instruction identification register (330) to support strand 1.

Furthermore, two RTR_PNTR[4:0] exist in the commit unit (300) to support the dual strand mode. In the dual strand mode, the commit unit (300) ignores a most significant bit of the RTR_PNTR[4:0] (316) and uses a strand identification maintained within the commit unit (300) to determine which half of the live instruction register (310) to access. Each RTR_PNTR[4:0] indexes half of the live instruction register (310), one RTR_PNTR[4:0] for each strand. One RTR_PNTR[4:0] accesses register locations 0 to 15 in the live instruction register (310), and the other RTR PNTR[4:0] accesses register locations 16 to 31 in the live instruction register (310).

When the commit unit (230 shown in FIG. 2) receives helper instructions from the instruction decode unit (220 shown in FIG. 2), the commit unit (230 shown in FIG. 2) updates the complex instruction identification register (330) by using the CID[3:0] (338) forwarded with the helper instruction. The CID[3:0] (338) contains the complex instruction identification assigned by the instruction decode unit (220 shown in FIG. 2). Furthermore, the FIRSTHELPER (314) and HELPER_INST (312) bits forwarded by the instruction decode unit (220 shown in FIG. 2) are entered with the helper instructions in the live instruction register (310).

When a retire pointer, e.g., RTR_PNTR[4:0] (316) of an active strand in the live instruction register (310), points to an entry whose HELPER_INST (312) is set, the commit unit (300) may determine that helper instructions are to be processed. The commit unit (300) can not retire the helper instructions until all the helper instructions corresponding to a given complex instruction have executed without generating an exception. The commit unit (300) samples a value in the CID_PNTR[3:0] (332) to index the complex instruction identification register (330). If the count maintained by HELPERCOUNT (336) that is indexed by the CID_PNTR [3:0] (332) is nonzero, the commit unit (300) samples the HELPERCOUNT (336) entry, e.g., HELPER_CNT[3:0] (340), every cycle until the HELPERCOUNT (336) entry equals zero. Accordingly, an instruction decode unit, a rename and issue unit, a data cache unit, and/or an execution unit in the computer system pipeline (200 shown in FIG. 2) may send a completion report, that includes a CID[3:0] (338), STRAND_ID and an exception bit, of a helper instruction to the commit unit (300).

When the commit unit (300) receives the completion report, the commit unit (300) uses the transmitted CID[3:0] (338) in the completion report to index the complex instruction identification register (330). The HELPERCOUNT (336) entry indexed by the transmitted CID[3:0] (338) is decrement by one. Also, the EXECEPTION BIT (334) of the entry indexed by the transmitted CID[3:0] (338) in the completion report is updated. When the HELPERCOUNT (336) decrements to zero, the commit unit (300) determines whether the EXCEPTION BIT (334) has been set. If the EXCEPTION BIT (334) has been set, the commit unit (300) suspends retiring of any of the helper instructions and takes a software trap.

When the HELPERCOUNT (336) decrements to zero and no EXCEPTION BIT (334) has been set, the commit unit (300) retires the helper instruction pointed to by the RTR_PNTR (316) and the helper instructions following the helper instruction pointed by the RTR_PNTR (316). The commit unit (300) continues to retire helper instructions in the live instruction register (310) until the RTR_PNTR (316) hits an instruction where a combination of the FIRSTHELPER (314) and HELPER_INST (312) equals 00 or 11. The combination of the FIRSTHELPER (314) and HELPER_INST (312) equal to 00 indicates that a non-helper instruction exists in the live instruction register (310).

The combination of the FIRSTHELPER (314) and HELPER_INST (312) equal to 11 indicates that a different helper instruction exists in the live instruction register (310).

Specific registers, register lengths, and register entry ordering have been disclosed. One of ordinary skill in the art will understand that different registers, register lengths, and register entry ordering may be used. Accordingly, a different number of supported complex instructions or a different number of helper instructions decoded from complex instructions may be supported. Furthermore, a different architectural design may require a different arrangement of the registers, register lengths, and register entry ordering.

Advantages of the present invention may include one or more of the following. In one or more embodiments, a complex instruction is advantageously decoded in hardware. Hardware decoding of a complex instruction may be faster than software decoding; thereby improving system performance.

In one or more embodiments, an instruction decode unit assigns an identification to all helper instructions associated with the same complex instruction. Helper instructions associated with a different complex instruction are assigned a different identification. The identifications are forwarded with the instructions. A commit unit uses the identification to determine which helper instructions have completed execution and which complex instructions may be retired.

In one or more embodiments, a commit unit supports a live instruction register and a complex instruction identification register. Accordingly, the live instruction register and the complex instruction identification register maintain a list of helper instructions, an indicator of how many helper instructions remain uncompleted, and an indicator of any exceptions generated by the helper instructions. Accordingly, complex instructions may be executed using helper instructions and an orderly system for the retirement of a complex instruction is enabled.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An instruction retirement apparatus, comprising:
   an instruction decode unit arranged to decode a complex instruction that is not supported by hardware into a plurality of helper instructions, wherein the plurality of helper instructions are supported by hardware;
   an execution unit arranged to execute the plurality of helper instructions;
   a live instruction register arranged to indicate which of the plurality of helper instructions are alive; and
   a complex instruction identification register arranged to maintain a complex instruction identification for the complex instruction, wherein the complex instruction identification register comprises a helper count register configured to indicate a number of helper instructions corresponding to the complex instruction,
   wherein the instruction retirement apparatus comprises functionality to retire the complex instruction when the plurality of helper instructions have been executed without an exception, and wherein the complex instruction is retired if the number of helper instructions indicated by the helper count register matches a number of alive helper instructions corresponding to the complex instruction in the live instruction register.

2. The apparatus of claim 1, wherein the live instruction register comprises a helper instruction register.

3. The apparatus of claim 1, wherein the live instruction register comprises a retirement pointer register.

4. The apparatus of claim 1, wherein the live instruction register comprises an instruction predecode register.

5. The apparatus of claim 1, wherein the complex instruction identification register is arranged to maintain the complex instruction identification for each complex instruction dependent on a register location.

6. The apparatus of claim 1, wherein the complex instruction identification register comprises an exception register.

7. The apparatus of claim 6, wherein the execution unit is arranged to update the exception register after at least one of the plurality of helper instructions is executed.

8. The apparatus of claim 1, wherein the complex instruction identification register comprises a complex instruction identification pointer register.

9. The apparatus of claim 1, wherein the execution unit is arranged to execute at least two of the plurality of helper instructions concurrently.

10. The apparatus of claim 1, wherein the instruction decode unit is arranged to support multiple strands.

11. A method for determining instruction retirement readiness, comprising:
    decoding a complex instruction that is not supported by hardware into a plurality of helper instructions, wherein the plurality of helper instructions are supported by hardware;
    executing the plurality of helper instructions;
    indicating which of the plurality of helper instructions are alive using a live instruction register; and
    maintaining a complex instruction identification for the complex instruction using, a complex instruction identification register,
    wherein the complex instruction identification register comprises a helper count register configured to indicate a number of helper instructions corresponding to the complex instruction,
    wherein the complex instruction is ready for retirement when the plurality of helper instructions have been executed without an exception and
    wherein the complex instruction is retired if the number of helper instructions indicated by the helper count register matches a number of alive helper instructions corresponding to the complex instruction in the live instruction register.

12. The method of claim 11, further comprising:
    indicating whether an instruction is a helper instruction.

13. The method of claim 11, further comprising:
    indicating a first helper instruction of the plurality of helper instructions.

14. The method of claim 11, further comprising:
    maintaining an index into the live instruction register.

15. The method of claim 11, wherein the maintaining is dependent on a register location.

16. The method of claim 11, further comprising:
    indicating an exception has occurred for at least one of the plurality of helper instructions.

17. The method of claim 16, further comprising:
    updating the exception dependent on the executing.

18. The method of claim 11, further comprising:
    maintaining an index into the complex instruction identification register.

19. The method of claim 11, wherein the executing comprises executing at least two of the plurality of helper instructions concurrently.

* * * * *